United States Patent [19]

Heinze et al.

[11] 3,901,676

[45] Aug. 26, 1975

[54] METHOD FOR CRYSTALLIZATION OF A FIBER WHILE STRETCHING

[75] Inventors: Gerhard Heinze, Schildgen; Manfred Schön, Cologne; Friedrich Schwochow, Leverkusen, all of Germany

[73] Assignee: Bayer Aktiengesellschaft, Leverkusen, Germany

[22] Filed: Feb. 11, 1974

[21] Appl. No.: 441,545

[30] Foreign Application Priority Data

Feb. 17, 1973 Germany.............................. 2308019

[52] U.S. Cl. ............................ 65/33; 65/2; 65/111; 65/114
[51] Int. Cl. ....................... C03b 29/00; C03b 21/00
[58] Field of Search ................ 65/33, 2, 3, 111, 114

[56] References Cited
UNITED STATES PATENTS

| | | | |
|---|---|---|---|
| 2,319,816 | 5/1943 | Land | 65/33 |
| 2,823,491 | 2/1958 | Long | 65/114 |
| 3,352,656 | 11/1967 | McMillan et al. | 65/33 |
| 3,799,836 | 3/1974 | Rogers et al. | 65/111 |

*Primary Examiner*—S. Leon Bashore
*Assistant Examiner*—Frank W. Miga
*Attorney, Agent, or Firm*—Burgess, Dinklage & Sprung

[57] ABSTRACT

Glass-ceramic fibers having a modulus of elasticity of more than 8,800 kp/mm² are obtained by heating an amorphous glass fiber to a temperature at which crystallization occurs while stretching the fiber at least about 10%. The fiber may be first heated to produce seed crystals followed by increasing the temperature for ceramitization.

4 Claims, 1 Drawing Figure

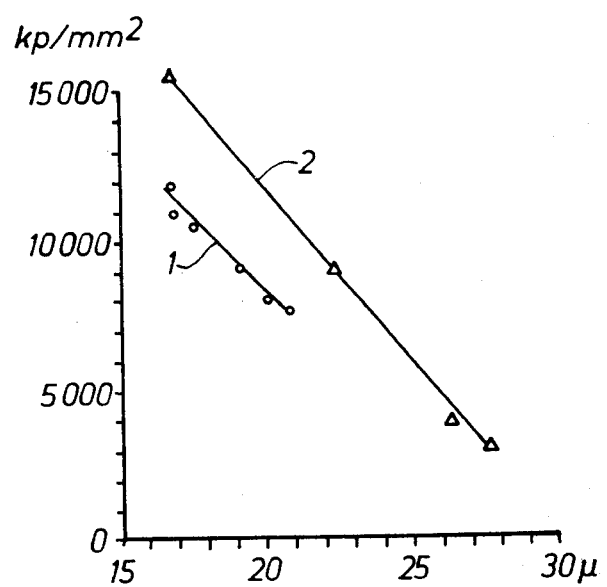

METHOD FOR CRYSTALLIZATION OF A FIBER WHILE STRETCHING

This invention relates to a process for the production of glass-ceramic reinforcing fibers with an improved modulus of elasticity.

Glass ceramics (cf. for example J. Petzoldt, K. Schilling, Fortschr. Miner. 49 (1972), pages 146–153) are generally understood to be a group of new glass-like materials having, in some cases, extremely low coefficients of thermal expansion. They may be obtained by converting amorphous glasses of special composition into a polycrystalline, extremely dense structure, which is generally impermeable to gases, by a controlled crystallization process. It is preferred to use $Li_2O$— and $MgO$—containing aluminosilicate glasses, in which either β-eucryptite and β-spodumene or cordierite is present as the polycrystalline main phase, according to crystallization. Since the required properties are only obtained in cases where crystallization results in a very finely divided, uniform crystallite structure, the actual crystallization process has to be preceded by controlled seed formation (W. Sack, H. Scheidler, Glastechn. Ber. 39 (1966), pages 126 – 130). Oxides, such as $TiO_2$ or $ZrO_2$, and also metals, such as Ag, Cu or Pt, in colloidal distribution may be added to the glass as seed formers. Ceramitization is carried out in two stages, generally by tempering first at low temperature (seed formation), and then at elevated temperature (crystal growth).

By virtue of its extremely low coefficient of thermal expansion, glass-ceramic material is mainly used for applications requiring a high resistance to fluctuating temperatures (rocket noses, telescope mirror supports, quartz-glass substitute, refractory vessels).

Since the workpieces are first molded from the amorphous parent glass and them ceramitized, it is even possible to produce complicated components from glass-ceramics.

The elasticity moduli for glass ceramics amount, for example, to around 8.800 $kp/mm^2$ for materials of β-eucryptite and β-spodumene, and to around 12,000 $kp/mm^2$ for materials of cordierite.

It has already been proposed to draw filaments from glasses of the kind suitable for the production of glass ceramics, and subsequently to convert the amorphous filaments into the polycrystalline state (U.S. Pat. No. 2,920,971, column 3, lines 53 – 58). Unfortunately, the elasticity moduli of filaments of this kind are no higher than those of compact glass ceramics.

The present invention provides a process for the production of glass-ceramic reinforcing fibers having an improved modulus of elasticity, in which amorphous fibrous glasses are crystallized by tempering in one or more stages and, at the same time, are stretched by at least 10% of their length.

It has surprisingly been found that crystallized fibers can have elasticity moduli considerably higher than those of compact glass. Thus, it was possible to increase the elasticity modulus of around 8.800 $kp/mm^2$ of glass ceramic filaments comprising β-eucryptite ($Li_2O$ . $Al_2O_3$ . $2SiO_2$) or β-spodumene ($Li_2O.Al_2O_3$.4 $SiO_2$), to in many cases values of from about 12,000 to 15,000 $kp/mm^2$, when the crystallisation process was accompanied by stretching.

In the practical application of the process according to the invention, the amorphous parent glasses are initially melted. Suitable glasses are, for example, glasses comprising $Li_2O$, MgO, $Al_2O_3$ and $SiO_2$, which can be crystallized into lithium silicates, h-quartz derivatives or cordierite (MgO . $2Al_2O_3$ . $5SiO_2$). However, it is also possible to use various other glasses which can be uniformly ceramitized. Accordingly, the invention also relates to glasses from which mullite ($3Al_2O_3$ . $2SiO_2$), spinel (MgO . $Al_2O_3$), corundum ($Al_2O_3$), nepheline ($Na_2O$ . $Al_2O_3$ . $2SiO_2$), anorthite (CaO . $Al_2O_3$ . $2SiO_2$), forsterite (2MgO . $SiO_2$) or albite ($Na_2O$ . $Al_2O_3$ . $6SiO_2$) can be separated as a crystalline phase in extremely fine distribution.

The production of glass ceramics of different composition is known per se. In addition to the already mentioned work of J. Petzoldt and K. Schilling, reference is made to the comprehensive work of W. Sack, Chem.-Ing.-Techn. 37 (1965), pages 1154 – 1165. Special production conditions, such as phase separation and seed formation, are described by W. Hinz and P. O. Knuth in Glastechn. Ber. 34 (1961), pages 431 – 437. The article by W. Baum in Glastechn. Ber. 36 (1963), pages 444 – 481, relates specifically to the production and the properties of a eucryptite-based glass-ceramic material.

The glass ceramic material is produced, for example, from the starting components quartz powder, aluminohydrate (hydrargillite), alkali and alkaline earth metal carbonates and rutile for $TiO_2$. One typical glass batch has the following composition, for example:

| | |
|---|---|
| $SiO_2$ | 43 – 75 parts by weight |
| $Al_2O_3$ | 12 – 36 parts by weight |
| $Li_2O$, MgO | 2 – 15 parts by weight |
| $TiO_2$ | 3 – 7 parts by weight |

A glass ceramic material of the following composition, for example, is produced from this batch:

| | |
|---|---|
| $SiO_2$ | 71 parts by weight |
| $Al_2O_3$ | 18 parts by weight |
| $Li_2O$ | 3 parts by weight |
| MgO | 3 parts by weight |
| $TiO_2$ | 5 parts by weight |

$TiO_2$ or $ZrO_2$ is preferably added as seed former to the glass batch, although it is also possible to use other oxides ($P_2O_5$, $SnO_2$, $V_2O_5$), halides (NaF, $CaF_2$) or colloidally dispersed metals (Cu, Ag, Au, Pt, Pd) for this purpose. In many cases, the glasses also contain boric acid or borates to improve their processability.

Glass fibers may be produced in conventional manner from the molten and carefully refined glasses by spinning from high-temperature-resistant noble metal dies, for example from platinum-rhodium dies, and may be subsequently subjected to the two-stage tempering process.

A microscope with a heatable slide, for example, can be used for determining the optimum temperatures for the ceramitizing process. It is possible in this way directly to observe the beginning of crystallization and crystal growth. However, it is also possible to determine the crystallization behavior by means of simple preliminary tests in a muffle furnace. Thus, the temperatures at which the glass begins to haze ("haze point") or soften ("softening point"), provide important reference points for accurately establishing the most favorable crystallization program. In general, temperatures of about 50° to 100°C below the haze point are suitable for seed formation, while temperatures which are only just below the softening point are preferred for crystallization. Depending upon the composition of the glass, seed formation is generally carried out at temperatures of about 400° to 600°C and crystallization at temperatures of about 600° to 1000°C, although crystallization temperatures above 1250°C and, hence, relatively high seed-forming temperatures as well, are required in many cases, for example for glasses rich in $Al_2O_3$. The tempering time required for the individual stages amounts to between a few hours and several days, although only glasses of the kind which can be crystallized very quickly (in periods of less than 1 hour) are really suitable for large-scale production. By using glasses of this kind, the reinforcing fibers according to the invention can be continuously produced.

The stretching of the glass fibers, which has to accompany crystallization, can be carried out in apparatus and conveyor systems of the kind used in the textile industry. For example, a filament travelling continuously between two delivery rollers can be stretched by driving the conveyor rollers at the beginning and at the end of the tempering zone at different speeds. In this way, it is possible to apply to the filament travelling between two heating zones (seed-forming and crystallization zones) an effectively controllable force by which it is readily possible to obtain a predetermined degree of stretching.

The following Examples illustrate the process according to the invention and demonstrate the influence of stretching upon the modulus of elasticity of the polycrystalline fibers.

EXAMPLE 1

A glass of the composition:
9.8 % by weight of $Li_2O$
16.6 % by weight of $Al_2O_3$
58.6 % by weight of $SiO_2$
5.0 % by weight of $TiO_2$
10.0 % by weight of $B_2O_3$ was melted in a platinum-rhodium die and drawn into 20.8 $\mu$ diameter fibers at a processing temperature of 1250°C.

The amorphous glass fibers had an E-modulus of 5450 kp/mm². According to investigations under a heating-stage microscope, the most favorable seed-forming temperature was 450°C and the most favorable crystallization temperature was 600°C. According to Debye-Scherrer photographs, the crystalline phase consisted of $\beta$-spodumene.

1/A: Crystallization without stretching

For crystallization, individual filaments approximately 20 cm long were fixed to a frame of high-temperature-resistant steel in such a way that the fibers were kept free from tensile stress. The tempering process was carried out in a program-controlled muffle furnace which was initially heated to 450°C in 1 hour and then kept at this temperature for another hour (seed formation). The temperature was then increased to 600°C in 1.5 hours and kept at this level for 2 hours (crystallization). The crystallized filaments were then cooled to 20°C at a linear cooling rate of 50°C per hour, and were cut immediately afterwards into measuring lengths 7 cm long. The modulus of elasticity was measured over a length between grips of 5 cm. The diameter of the filaments did not undergo any change during the tempering process, and their modulus of elasticity amounted to an average of 6300 kp/mm². The following individual results were obtained: (Table 1).

Table 1

Elasticity modulus values after crystallization into $\beta$-spodumene without stretching

| Measurement Filament | Number Section | Mechanical data after crystallization diameter ($\mu$) | E-modulus (kp/mm²) |
|---|---|---|---|
| 1 | A | 20.8 | 6240 |
| 1 | B | 20.8 | 6270 |
| 1 | C | 20.8 | 6290 |
| 2 | A | 20.8 | 6310 |
| 2 | B | 20.8 | 6460 |
| 2 | C | 20.8 | 6370 |

1/B: Crystallization with stretching

For crystallization, the amorphous starting fibers obtained in Example 1 were gripped firmly at one end. At their other ends, the filaments were guided over a roller and various weights were attached to them. This method of suspension led during crystallization to varying degrees of elongation, so that it was possible to determine the influence of stretching upon the modulus of elasticity. The muffle furnace was set to the same tempering program as in Example 1/A. Table 11 shows the elasticity moduli obtained (measured over a length between grips of 5 cm), in dependence upon the change in fiber diameter.

Table 11

Elasticity modulus values after crystallization into $\beta$-spodumene with stretching

| Filament No. | Diameter ($\mu$) after crystallization | E-modulus (kp/mm²) |
|---|---|---|
| 1 | 20.8 | 7640 |
| 2 | 20.0 | 8000 |
| 3 | 19.2 | 9220 |
| 4 | 17.6 | 10500 |
| 5 | 16.8 | 10860 |
| 6 | 16.8 | 11750 |

EXAMPLE 2

A glass of the composition:
10.1 % by weight of $Li_2O$
34.1 % by weight of $Al_2O_3$
47.4 % by weight of $SiO_2$
4.2 % by weight of $TiO_2$
4.2 % by weight of $B_2O_3$ was drawn into individual 28$\mu$ diameter filaments at 1350°C. The optimum seed-forming temperature of this glass was 600°C and the optimum crystallization temperature was 700°C. According to Debye-Scherrer photographs, $\beta$-eucryptite was formed as the crystalline phase.

For tempering in this Example, an individual filament 120 cm long with a uniform diameter of 28$\mu$ was suspended in a vertical tubular furnace and a 2 g weight was attached to it. For seed formation, the temperature of the furance was increased in 30 minutes to 600°C and kept at this level for 1 hour. Crystallization took place over a period of 1 hour at 700°C.

Because of the temperature profile prevailing in the tubular furnace, in which the temperature at the middle of the furnace was somewhat higher than at its ends, the filament underwent different degrees of stretching. After crystallization that section of filament in the middle, hottest zone of the tubular furnace had been stretched to the greatest extent.

The differentially stretched individual filament was carefully cut into measured sections 7 cm long, and the modulus of elasticity was determined in dependence upon the filament diameter over a length between grips of 5 cm. Table 111 shows the results obtained.

Table 111

Elasticity moduli after crystallization into β-eucryptite with stretching

| Section | Diameter ($\mu$) after stretching | E-modulus (kp/mm$^2$) |
| --- | --- | --- |
| A | 27.6 | 3060 |
| B | 26.4 | 3870 |
| C | 22.4 | 8850 |
| D | 16.8 | 15600 |

The influence of the degree of stretching upon the modulus of elasticity is shown in the accompanying figure in the form of a graph for both types of glass investigated (Example 1/B - curve 1, and Example 2 - curve 2). The fiber diameter in ($\mu$) after stretching is recorded as abscissa, and the modulus of elasticity in [kp/mm$^2$] as ordinate.

The invention is particularly applicable to glasses having the approximate content by weight

| | |
| --- | --- |
| SiO$_2$ | 50 – 75 parts by weight |
| Al$_2$O$_3$ | 12 – 38 parts by weight |
| Li$_2$O + MgO | 2 – 15 parts by weight | possibly along with varying amounts of other oxides.

The fibers may vary in cross-sectional area or denier, generally ranging from about 8 to 40 $\mu$ and preferably about 10 to 25 $\mu$ in diameter.

They are especially suited for use as reinforcements wherever glass fibers have heretofore been employed but their low coefficients of expansion and high modulus of elasticity render them also useful e.g. in making compound plastic materials for parts having high form stability and impact strength.

It will be appreciated that the instant specification illustration and not limitation, and that various modifications and changes may be made without departing from the spirit and scope of the present invention.

What is claimed is:

1. A process for the production of a glass fiber of improved modulus of elasticity comprising heating the fiber to a temperature at which crystallization occurs while stretching the fiber at least about 10% of its length.

2. A process according to claim 1 wherein the fiber prior to crystallization is heated to a temperature of at least about 400°C to produce crystal seeds and is thereafter heated to a higher temperature for crystallization.

3. A process according to claim 2 wherein heating to produce seed crystals is effected at about 400° to 600°C and crystallization is effected at about 600° to 1000°C.

4. A process according to claim 1 wherein the fiber approximately comprises by weight

| | |
| --- | --- |
| SiO$_2$ | 50 – 75 parts by weight |
| Al$_2$O$_3$ | 12 – 38 parts by weight |
| Li$_2$O + MgO | 2 – 15 parts by weight. |

* * * * *